(12) United States Patent
Friedrich

(10) Patent No.: US 9,234,502 B2
(45) Date of Patent: Jan. 12, 2016

(54) WIND TURBINE AND ASSOCIATED CONTROL METHOD

(75) Inventor: Michael Friedrich, Silkeborg (DK)

(73) Assignee: Envision Energy (Denmark) ApS, Silkeborg (DK)

(*) Notice: Subject to any disclaimer, the term of this patent is extended or adjusted under 35 U.S.C. 154(b) by 799 days.

(21) Appl. No.: 13/472,912

(22) Filed: May 16, 2012

(65) Prior Publication Data

US 2012/0294714 A1  Nov. 22, 2012

(30) Foreign Application Priority Data

May 19, 2011 (DK) .................................. 2011 70247

(51) Int. Cl.
*F03D 7/02* (2006.01)

(52) U.S. Cl.
CPC ............ *F03D 7/0268* (2013.01); *F03D 7/0228* (2013.01); *F05B 2240/30* (2013.01); *F05B 2240/302* (2013.01); *Y02E 10/721* (2013.01); *Y02E 10/723* (2013.01)

(58) Field of Classification Search
CPC ... F03D 7/0268; F03D 7/0252; F03D 7/0228; F05B 2240/30; F05B 2240/302; Y02E 10/721; Y02E 10/723
See application file for complete search history.

(56) References Cited

U.S. PATENT DOCUMENTS

| | | | | |
|---|---|---|---|---|
| 4,180,369 A * | 12/1979 | Ottosen | ...................... | 415/208.1 |
| 4,180,372 A * | 12/1979 | Lippert, Jr. | ............ | F03D 7/0252 416/132 B |
| 4,297,076 A * | 10/1981 | Donham et al. | ................. | 416/37 |
| 4,355,955 A | 10/1982 | Kisovec | | |
| 4,557,666 A * | 12/1985 | Baskin et al. | ..................... | 416/32 |
| 5,527,151 A * | 6/1996 | Coleman et al. | ................. | 416/23 |
| 5,527,152 A * | 6/1996 | Coleman et al. | ................. | 416/23 |
| 5,570,859 A * | 11/1996 | Quandt | ......................... | 244/213 |
| 5,616,963 A * | 4/1997 | Kikuchi | ............... | F03D 7/0236 290/55 |
| 6,441,507 B1 * | 8/2002 | Deering et al. | ................. | 290/44 |
| 6,582,196 B1 | 6/2003 | Andersen et al. | | |
| 6,870,281 B2 | 3/2005 | Weitkamp | | |
| 7,821,148 B2 * | 10/2010 | Piasecki et al. | ................. | 290/44 |
| 2003/0075929 A1 | 4/2003 | Weitkamp | | |
| 2009/0028704 A1 * | 1/2009 | Rebsdorf et al. | ................. | 416/23 |
| 2009/0028705 A1 * | 1/2009 | Meldgaard et al. | ............. | 416/23 |
| 2009/0226324 A1 * | 9/2009 | Garcillan Rueda et al. | ......................... | 416/223 R |
| 2009/0236857 A1 * | 9/2009 | Stommel | ......................... | 290/55 |

(Continued)

FOREIGN PATENT DOCUMENTS

DE  10 2006 041 383 A1  3/2008
DE  10 2009 004 070 A1  7/2010

(Continued)

*Primary Examiner* — Craig Kim
*Assistant Examiner* — Wayne A Lambert
(74) *Attorney, Agent, or Firm* — Roberts Mlotkowski Safran & Cole, PC; David S. Safran

(57) ABSTRACT

A method for controlling a two-bladed pitchable swept-blade wind turbine in extreme wind conditions is described, wherein when extreme conditions are detected or forecast for the wind turbine, the wind turbine blades are pitched such that they will passively align in a substantially horizontal arrangement. The blades can be yawed such that a tip of one of the wind turbine blades points into the wind direction, resulting in a reduced surface area of the blades exposed to the extreme wind forces. This reduced surface area provides for a reduction in the extreme loads which may be experienced by the wind turbine in such extreme wind conditions.

12 Claims, 5 Drawing Sheets

(56) References Cited

U.S. PATENT DOCUMENTS

2011/0248501 A1* 10/2011 Siegfriedsen .................. 290/44
2012/0294715 A1* 11/2012 Rebsdorf ........................ 416/1

FOREIGN PATENT DOCUMENTS

| EP | 0 709 571 A2 | 5/1996 |
| EP | 1 286 049 A2 | 2/2003 |

* cited by examiner

WIND TURBINE AND ASSOCIATED CONTROL METHOD

BACKGROUND OF THE INVENTION

1. Field of the Invention

The present invention relates to a wind turbine and a method of controlling such a wind turbine, in particular a method of controlling a wind turbine to reduce maximum loads experienced by the wind turbine during extreme wind conditions.

2. Description of Related Art

Wind turbines can often be located in areas having relatively predictable wind patterns, e.g. varying between ~15-25 m/s. However, during storm conditions wind speeds can often reach extreme levels capable of damaging wind turbine structures. For example, off-shore wind turbine installations may experience typhoon or hurricane conditions, wherein the wind speed may exceed 70 m/s during gusts. The high wind speeds mean that wind turbines intended for a site susceptible to extreme wind conditions have to be constructed with sturdier materials and/or additional reinforcement elements, in order to withstand the effects of the high winds possible in such areas, and to be rated suitable for use in the locations in question. Furthermore, high wind speeds during gusts can result in significant fatigue loads in the structural components of the wind turbine, which can lead to additional wear-and-tear on the wind turbine structure. Accordingly, it is of interest to find ways to reduce the impact of extreme wind conditions on wind turbines.

European Patent Application Publication No. 0 709 571 describes a two-bladed partial pitch wind turbine which reduces the effect of extreme wind conditions. The turbine comprises first and second rotor blades, having inner and outer blade sections, the outer blade sections pitchable relative to the inner blade sections. During high winds, the rotor blades are parked in a substantially horizontal alignment, and the outer section of the first blade is pitched to be at a 90 degree angle to the inner section of the first blade, while the outer section of the second blade is unpitched. The azimuth or yaw brake is released, and the rotor structure comprising the first and second rotor blades acts as a wind vane when exposed to high winds. As a result, the rotor is moved about the yaw axis such that the tip end of the first rotor blade is pointing directly into the oncoming wind, and consequently presents a reduced surface area against which the wind acts on. The reduced surface area results in reduced forces on the turbine during the high wind conditions, and reduced loading in the wind turbine structure.

Several problems exist for this solution however. For the wind turbine blades to be provided in a horizontal alignment, sophisticated positioning and braking and/or locking systems are employed in the turbine. These braking/locking systems may experience significant fatigue loads during operation, due to the high wind levels experienced. Accordingly, such systems may require regular maintenance to ensure efficient operation.

SUMMARY OF THE INVENTION

It is an object of the invention to provide a wind turbine and an associated control method which provides improved performance at high wind speeds leading to extreme loads, and which overcomes the above problems.

Accordingly, there is provided a method for reducing wind loads in a pitchable two-bladed swept-blade wind turbine during extreme wind conditions, the wind turbine having first and second wind turbine rotor blades of at least 35 meters length, wherein the tip ends of the blades are swept relative to the central axis of the blades, the method comprising the steps of:

providing the wind turbine blades in a substantially horizontal alignment; and aligning the substantially horizontal wind turbine blades such the blades are longitudinally aligned with the wind direction at the turbine to reduce the extreme wind loads experienced by the wind turbine blades, wherein the step of providing comprises pitching the wind turbine blades such that the pitched profile of the blades provides an adjusted aerodynamic profile, the adjusted aerodynamic profile operable to passively align the wind turbine blades in a substantially horizontal alignment.

As the rotor blades are aligned with the wind direction such that one of rotor blades effectively points into the direction of the oncoming wind, this reduces the surface area of the blades acted on by the extreme winds, and accordingly reduces the magnitude of the extreme loads experienced by the turbine structure. The swept blade design means that by appropriate pitching of the blades, the combined aerodynamic profile of the two blades can act to passively align the blades in a substantially horizontal position, removing the requirement for the use of locking or braking systems to align the blades horizontally. Preferably, the changed aerodynamic profile acts to rotationally align the blades with the direction of the oncoming wind, using the force of the oncoming wind. As the wind will be blowing in a substantially horizontal direction, the blades are accordingly substantially horizontally aligned. Preferably, the blades are aligned with the angle of the wind direction at the wind turbine +/−20 degrees, preferably +/−5 degrees.

Preferably, the step of pitching is performed such that the equilibrium point for the rotor blades along the rotational path of the wind turbine blades (which may include any associated rotor hub) is when the blades are in a substantially horizontal position.

It will be understood that the wind turbine comprises a tower which may be provided in suitable foundations, a nacelle provided at the top of the tower, and a rotor hub provided at said nacelle, the blades mounted to the rotor hub. By an extreme wind condition, it will be understood that this refers to very high wind speeds which can occur in the vicinity of the wind turbine tower, and for which said wind turbine towers and foundations must be designed to cope with adequately.

Preferably, the swept blades of the wind turbine comprise forward-swept blades. Forward-swept blades comprise wind turbine blades which are shaped such that the tip ends of the blades are swept away from a wind turbine tower. (I.e. The blades deflect outwardly from the tower.) Normal straight blades may deform during rotation due to the action of the rotational forces, to the point that the tips of the blade may strike the wind turbine tower. The use of a forward-swept design ensures that any deformation of the blade during operation will not require additional tower-to-tip clearance.

The swept curvature of the blades allows for the aerodynamic profile of the blades to be altered through pitching of at least a portion of the blades, such that a portion of the swept sections of the blades acts to align the blades in a substantially horizontal position, in line with the wind direction at the turbine. It will be understood that the wind turbine blades may be rotationally aligned with the direction of the oncoming wind at the wind turbine, such that the angle of alignment of the wind turbine blades can be dependent on the angle that the oncoming wind makes to the horizontal.

It will be understood that said step of aligning may be performed before said step of providing, such that the wind turbine blades are yawed in an azimuthal direction until the path of rotation of the wind turbine blades is substantially in line with the direction of the wind at the turbine. The blades may then be pitched such that the oncoming wind acts to align the blades in a horizontal position.

Preferably, said step of pitching comprises pitching the blades such that the swept tip ends of the blades point in substantially the same direction along the rotational path of the wind turbine rotor blades.

By aligning the tip ends of the blades in the same direction along the rotational path of the wind turbine blades, the combined blades act similar to a balanced two-cup anemometer, and will automatically and passively align in a substantially horizontal arrangement under the force of the oncoming wind at the turbine. Furthermore, the blades will passively rotate to align with the direction of the wind at the turbine, due to the substantially equal in magnitude but opposite in direction rotational forces experienced by the swept sections of the blade, due to the pitched arrangement. Such a passive alignment ensures that the blades will always align with the wind direction, to reduce the surface area exposed to the winds, and accordingly reduces the forces experienced by the turbine, without the need for complex braking/locking and control systems normally required to maintain the blades in a horizontal position.

Preferably, the step of pitching comprises pitching said blades such that the swept tip ends have a pitch angle of approximately +/−90 degrees.

For forward-swept blades, by pitching each of the blades by a pitch angle of 90 degrees, the tip ends of both blades will point in the same direction along the path of rotation of the wind turbine blades. It will be understood that the blades may be both pitched either positively, to a pitch angle of +90 degrees, or pitched negatively, to a pitch angle of −90 degrees.

In a particularly preferred embodiment, the wind turbine comprises a first blade having a first swept tip end and a second blade having a second swept tip end, and wherein the step of pitching comprises pitching said first blade such that said first swept tip end has a pitch angle of approximately 85-95 degrees (preferably approximately 90 degrees) and pitching said second blade such that said second swept tip end has a pitch angle of between approximately 45-85 degrees (preferably approximately 55-65 degrees, further preferably approximately 60 degrees).

In tests undertaken, it was surprisingly found that pitching the blades to such a configuration provided improved performance of the invention. It is thought that this asymmetrical pitching acts to more effectively balance the wind turbine blades in a substantially horizontal position due to the effect of inertial forces, gravity, etc., and also accordingly acts to resist the rotation of the blades from said substantially horizontal position.

In one embodiment, the method comprises the steps of:
  pitching said blades such that said swept tip ends of said blades have a pitch angle of approximately 85-95 degrees (preferably approximately 90 degrees) to passively align the wind turbine blades in a substantially horizontal alignment; and
  when said wind turbine blades are substantially horizontally aligned, pitching one of said blades such that the tip end of said one of said blades has a pitch angle of between approximately 45-85 degrees (preferably approximately 55-65 degrees, further preferably approximately 60 degrees).

In this embodiment, the safety shutdown procedure involves a two-step pitching process, wherein the blades are initially symmetrically pitched to relatively quickly passively align the blades in a substantially horizontal direction. Once horizontal, one of the blades is then pitched to a second pitch angle, resulting in an asymmetrical pitching arrangement of the tip swept ends, which provides for a more stable horizontal alignment of the blades.

Preferably, said step of pitching is arranged such that the blade which is pitched to a pitch angle of between approximately 45-85 degrees is the blade which points into the direction of the wind at the wind turbine.

Testing of the invention has shown that ensuring that the particular swept blade section which is pitched to between 45-85 degrees is the blade which points into the wind direction results in a wider cone of stable operation of the wind turbine during the safety shutdown procedure.

It will be understood that the above pitch angles may refer to the magnitude of the pitching performed, and may equally apply to pitching performed in a positive or a negative direction.

Preferably, the wind turbine comprises a first blade and a second blade, wherein the blades comprise a substantially concave pressure side and a substantially convex suction side, and wherein the method comprises:
  pitching at least a portion of said blades such that at least a portion of said concave pressure sides face in substantially the same direction along the rotational path of the wind turbine rotor blades, such that the drag forces produced by the concave pressure side of the first blade and the convex suction side of the second blade will substantially balance the drag forces produced by the convex suction side of the first blade and the concave pressure side of the second blade to stabilize the wind turbine blades in a substantially horizontal arrangement.

The pitched swept blades act as a two-cup anemometer, which will automatically align itself with the wind direction due to the force of the wind on the cups. Here, the curved sections of the blades, once pitched, act as the cups, wherein one of the blades will have an increased drag at any one time due to the orientation of the blades along the rotational path of the blades. Under the effect of the wind, the blades will rotate and will gradually stabilize into a position where the drag on the two "cups" will be equal, i.e. when the forces equalise at the equilibrium position under the wind, where the blades are aligned with the wind direction at the turbine in a substantially horizontal arrangement.

Preferably, the method comprises the step of increasing the drag of the pitched concave pressure sides of the blades.

In order to provide improved operation of the system, the drag of the pitched section of the blades may be increased (to increase the concavity of the sections). This can provide for faster stabilisation of the blades in the substantially horizontal position, and accordingly the forces experienced by the wind turbine under extreme wind conditions may be reduced more quickly, resulting in reduced forces experienced by the wind turbine structure.

Methods of increasing the drag may comprise mounting spoilers or gurney flaps to the concave sections of the wind turbine blades. Furthermore this may comprise actuating an adjustable spoiler or flap provided on the blades.

In a particular embodiment, the method comprises the steps of:
  in the event of an extreme wind condition, pitching the rotor blades such that the swept tip ends of the rotor blades point in substantially the same direction along the rotational path of the wind turbine rotor blades, and aligning said rotor blades such that the rotational path of the rotor blades is in line with the wind direction at the wind turbine, such that the pitched swept tip ends act to align the wind turbine blades in a substantially horizontal position; and when in a substantially horizontal position, pitching the rotor blades such that the swept tip ends of the rotor blades point in a substantially downwards direction, to lower the centre of mass of the rotor blades and to resist the rotation of the wind turbine blades from said substantially horizontal position.

In this embodiment, the blades may be pitched in a first arrangement to slow the rotation of the blades until they stabilize into a substantially horizontal position, and then to pitch the blades again such that the tip ends of the blades point downwards towards the surface level, thereby lowering the centre of balance of the wind turbine blades (and any associated wind turbine hub) to prevent further rotation of the wind turbine blades from said substantially horizontal position.

Preferably, the wind turbine comprises a tower, a nacelle located at the top of said tower, a rotor hub rotatably mounted at said nacelle, a generator coupled to said rotor hub via a shaft, a pair of wind turbine blades of at least 35 meters length provided on said rotor hub, and a yaw system coupled to said nacelle, and wherein said step of aligning the substantially horizontal wind turbine blades comprises actively yawing said nacelle and said rotor hub by actuating said yaw system.

By actively yawing the blades to longitudinally align the blades with the wind direction, this provides for greater control of the wind turbine during extreme wind conditions, allowing for the rotor blade alignment to be managed based on the current conditions at the wind turbine. Such active yawing ensures accurate alignment of the wind turbine blades for all dimensions of wind turbine.

Preferably, the wind turbine blades comprise a partial pitch blade having an inner blade section and an outer blade section, and wherein said step of pitching comprises pitching said outer blade section relative to said inner blade section.

Preferably, said inner blade section comprises an aerodynamic profile which is unpitched relative to said outer blade section, the unpitched aerodynamic profile of the inner blade section acting to stabilize rotation of the wind turbine blades As the inner blade sections have an aerodynamic profile which is unpitched, the inner blade section will be in line with the wind direction at the turbine, and will present reduced drag to the oncoming wind. This will prevent the blades from rotating at high speeds, and will increase the stability of the wind turbine blades when in the equilibrium position of the horizontal alignment.

There is also provided a wind turbine comprising
a tower,
a nacelle located at the top of said tower,
a rotor hub rotatably mounted at said nacelle,
a generator coupled to said rotor hub via a shaft, and
a pair of swept-blade wind turbine blades of at least 35 meters length provided on said rotor hub, wherein the wind turbine further comprises a controller operable to implement any steps of the above described method.

There is also provided a general control method for horizontally aligning the blades in a pitchable two-bladed swept-blade wind turbine, the wind turbine having first and second wind turbine blades of at least 35 meters length, wherein the tip ends of the blades are swept relative to the central axis of the blades, the method comprising the steps of:

pitching the rotor blades such that the swept tip ends of the blades provide an adjusted aerodynamic profile of the wind turbine blades, the adjusted aerodynamic profile operable to passively align the wind turbine blades in a substantially horizontal alignment.

The method of pitching the swept blades may be used as a general method of horizontally aligning blades in a two-bladed wind turbine, e.g. in advance of a maintenance operation, prior to applying brakes and/or rotor locks to the wind turbine blades to immobilise the blades in the horizontal position.

An embodiment of the invention will now be described, by way of example only, with reference to the accompanying drawings, in which:

DETAILED DESCRIPTION OF THE INVENTION

Figure 1:
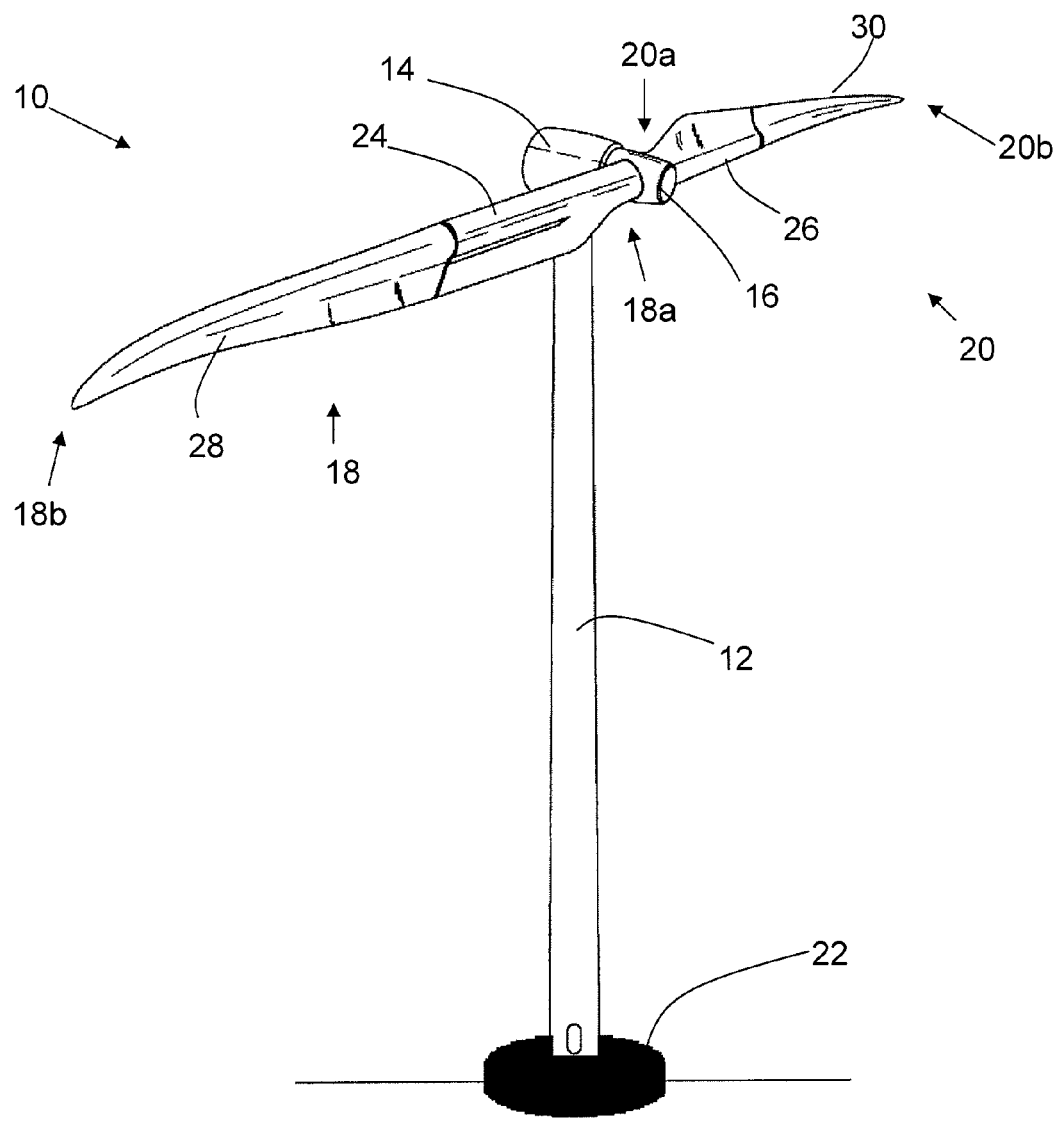
FIG. 1 is a perspective view of a two-bladed partial-pitch swept-blade wind turbine according to an embodiment of the invention.
Figure 2:
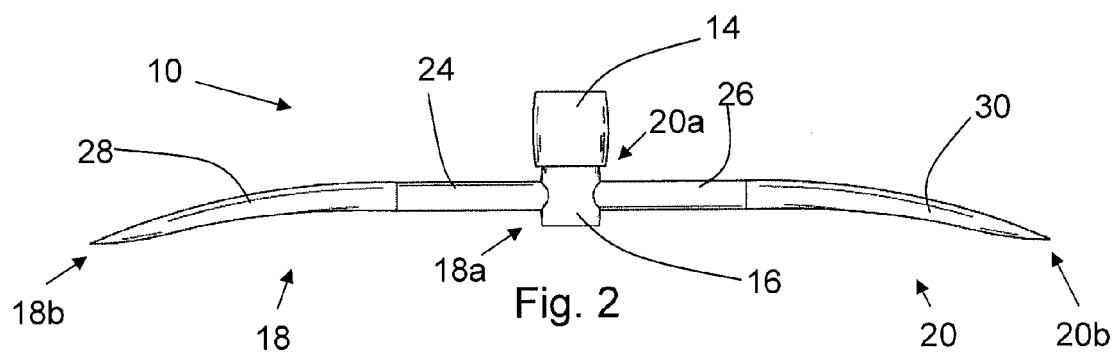
FIG. 2 is a top plan view of the wind turbine of FIG. 1.

With reference to FIGS. 1 and 2, a swept-blade partial-pitch two-bladed wind turbine is indicated generally at 10. The wind turbine 10 comprises a wind turbine tower 12, a nacelle 14 provided at the top of said tower 12, and a rotor hub 16 provided at said nacelle 14. First and second partial pitch rotor blades 18,20 are provided on opposite sides of said rotor hub 16. In FIG. 1, the tower 12 is shown provided on a wind turbine base 22, which may comprise any suitable wind turbine foundation. It will be understood that while the illustrated embodiment describes the use of the invention for an on-shore wind turbine, it will be understood that the invention may equally apply to wind turbines for use in an off-shore environment.

The first and second partial pitch rotor blades 18,20 each comprise a blade body having a root end 18a,20a mounted to said rotor hub 16 and a distal tip end 18b,20b. The rotor blades 18,20 comprise respective inner blade sections 24,26 provided at said root ends 18a,20a, and respective outer blade sections 28,30 provided at said tip ends 18b,20b. The rotor blades 18,20 further comprise a pitch system (not shown) provided in each blade at the junction between the inner blade sections 24,26 and the outer blade sections 28,30.

The pitch system is operable to pitch the outer blade sections 28,30 relative to the inner blade sections 24,26. In FIGS. 1 and 2, the rotor blades 18,20 are shown unpitched (i.e. the outer blade sections 28,30 are pitched at a 0 degree pitch angle).

As can be seen in FIG. 2, the wind turbine blades 18,20 of the wind turbine 10 are forward-swept wind turbine blades, in that the blades are shaped such that the tip ends 18b,20b of the blades 18,20 point away from the wind turbine tower 12 (the tip ends of the blades are swept relative to the central longitudinal axis of the blades). Such forward-swept blades can be used in wind turbines to ensure that there is an adequate tip-to-tower ratio for operation of the wind turbine.

It will be understood that the invention may equally apply to any swept-blade wind turbine configuration.

While the present embodiment describes the use of the invention for a partial pitch wind turbine, it will be understood that the invention may apply to any suitable two-bladed swept-blade wind turbine configuration (e.g. having full-pitch blades), and is not limited to a partial pitch wind turbine.

The wind turbine 10 further comprises a controller (not shown) which is operable to implement a safety shutdown procedure in the event of extreme wind conditions. Such a controller may be a self-contained control device provided in the wind turbine structure, and/or may be communicatively coupled to a remote control station capable of managing the wind turbine operation from a remote location.

Dependent on the prevailing wind conditions in a region, the design considerations of the wind turbine structure may be altered accordingly. By an extreme wind condition, it will be understood that this refers to very high wind speeds which can occur in the vicinity of the wind turbine tower, and for which said wind turbine towers and foundations must be designed to cope with adequately. In particular, the International Electrotechnical Commission (IEC) specifies extreme wind conditions as wind shear events, as well as peak wind speeds due to storms and rapid changes in wind speed direction. A wind turbine is expected to withstand extreme wind conditions of a specified wind speed to qualify as a particular class of IEC turbine (for example, an extreme wind of 70 m/s wind speed is currently specified for an IEC Class I turbine).

It will be understood that the definition of such extreme wind conditions may depend on several factors, e.g. the maximum wind speed rating for the desired class of wind turbine, and/or the wind speed which would be classified as a once in 10/50/100 years event (relative to the normal prevailing wind conditions at the wind turbine site).

For most regions in Europe, a wind speed of greater than 20 meters per second (m/s) may be regarded as an extreme wind condition. However, in typhoon- or hurricane-prone regions in Asia, such a turbine may need to be rated to withstand winds of up to 70 m/s. Thus, the design of the turbine structure may involve more use of reinforcement elements. For such a reinforced turbine, an extreme wind condition may be at a higher level than in the case of a European-based turbine. In general, a weather system comprising sustained winds of at least 33 meters per second (or 119 km/hour) is classified as a typhoon or hurricane.

In the event of a detected or forecast extreme wind condition, the wind turbine controller is operable to pitch the outer blade sections 28,30 in a particular manner that will allow the wind turbine blades 18,20 to passively align in a substantially horizontal position.

When the blades 18,20 are horizontally aligned, the wind turbine 10 is operable to detect the current wind direction at the turbine, and to yaw the rotor assembly of the wind turbine (comprising the wind turbine blades 18,20 and the rotor hub 16, provided on the nacelle 14) such that the tip end 18b of one of the wind turbine blades 18 is pointed in the direction that the current wind is coming from, e.g. if the wind is detected to be South Westerly, the wind turbine blades 18,20 are actively yawed using the turbine yaw mechanism (not shown) until the blades 18 are aligned with the wind direction, such that one of the tip ends 18b will point in a South Westerly direction, and the opposed tip end 20b points in a North Easterly direction.

It will also be understood that the step of longitudinally aligning the blades 18, 20 with the wind direction at the turbine 10 may be performed in parallel with, or before, the above described pitching step. In such a case, the rotor assembly of the wind turbine may be yawed such that the plane of rotation of the wind turbine blades 18, 20 is in parallel with the wind direction at the turbine 10.

As the blades 18, 20 are aligned with the direction of the wind, the surface area of the blades 18, 20 presented to the wind is minimised (when compared with the situation when the wind may be acting on the surface along the entire longitudinal length of the blade). As the surface area is minimised, accordingly the load forces experienced by the wind turbine structure due to the extreme wind are also minimised. This leads to a reduction in the extreme loads experienced by the wind turbine 10. An advantage of such a reduction in extreme loads is that the construction requirements for the wind turbine structure may also be reduced, resulting in less manufacturing cost and effort.

Figure 3:
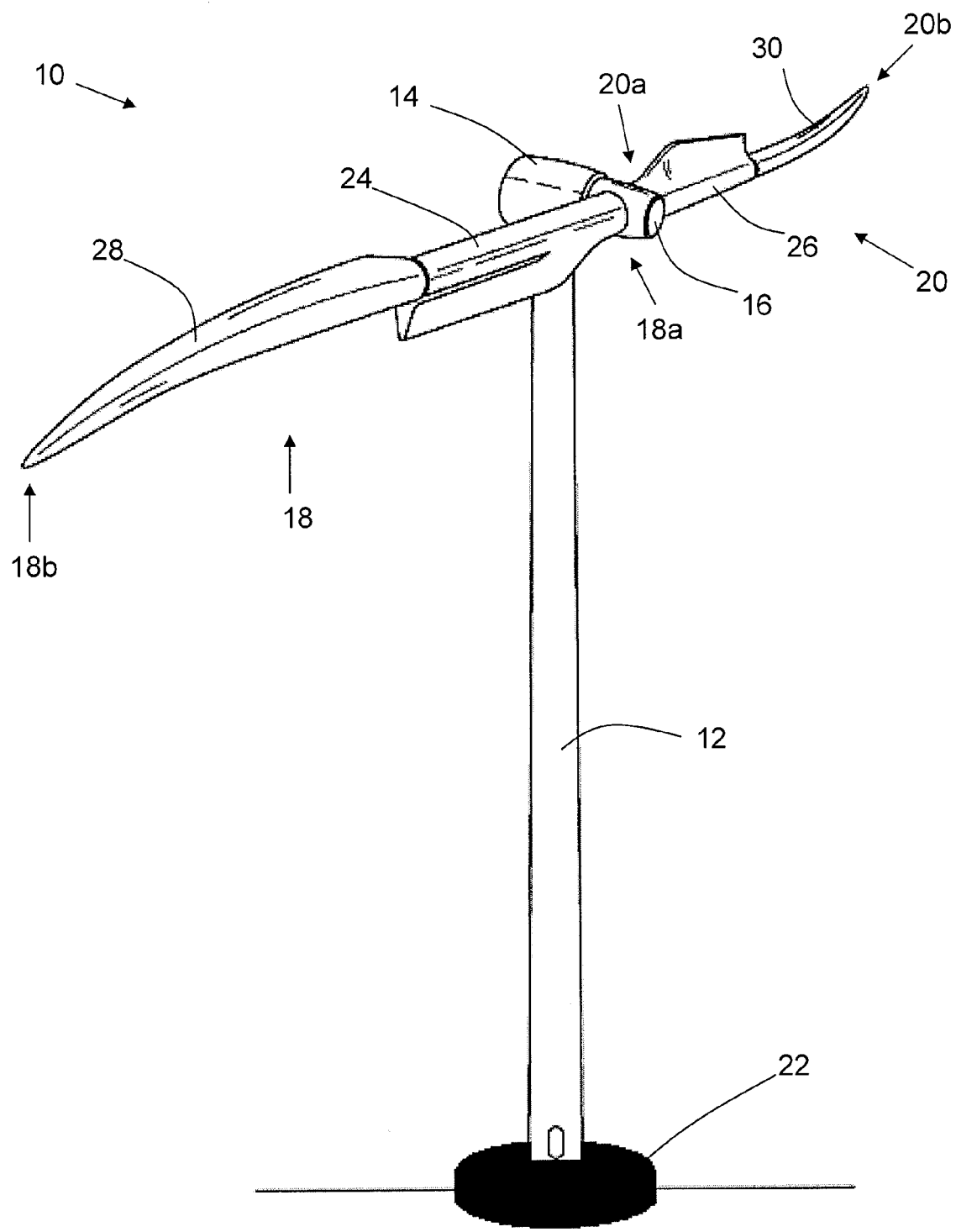
FIG. 3 is a perspective view of the wind turbine of FIG. 1 when the wind turbine blades are pitched to balance the wind turbine blades.
Figure 4:
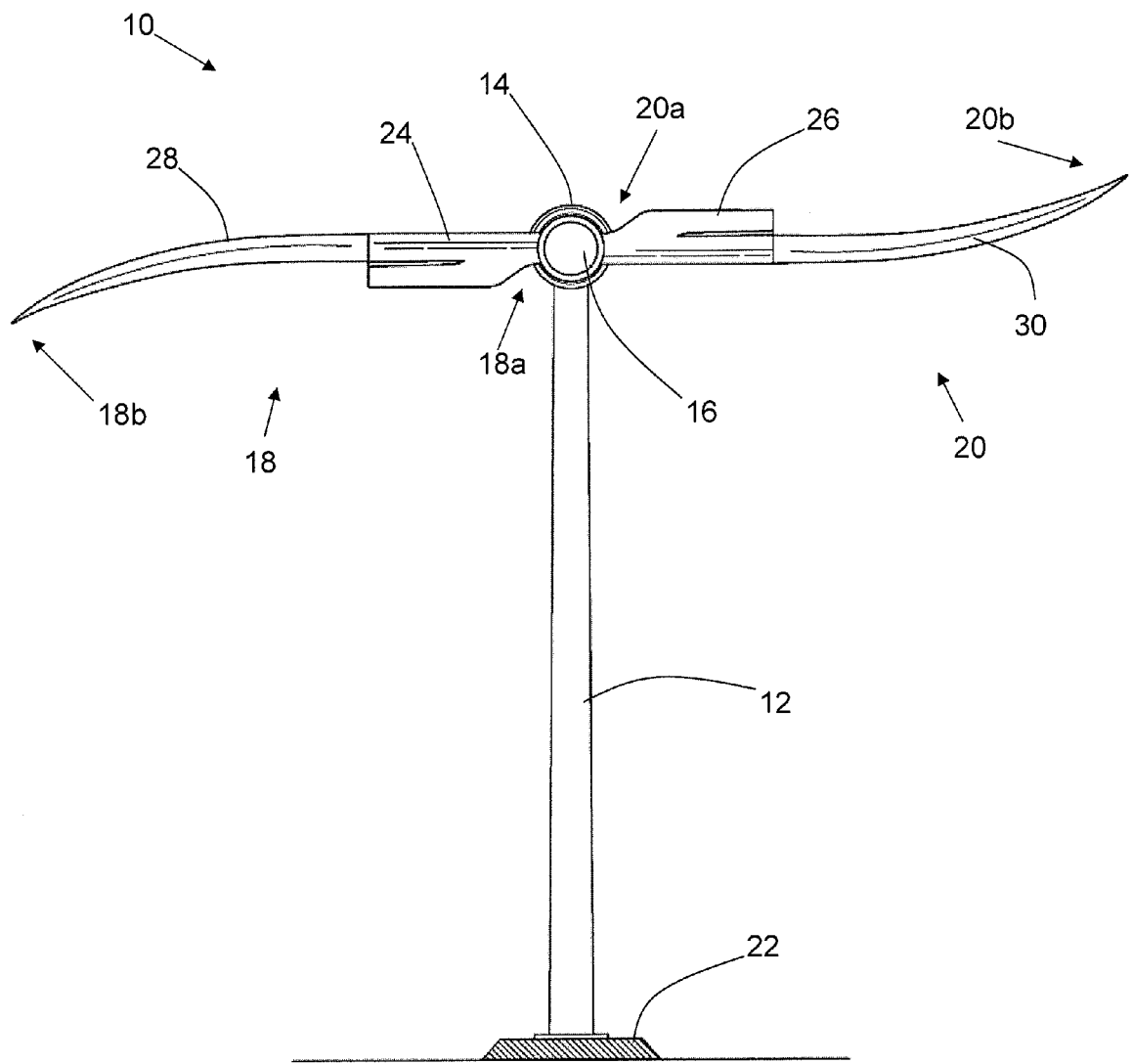
FIG. 4 is a front plan view of the wind turbine of FIG. 3.

With reference to FIGS. 3 and 4, it can be seen that the outer blade sections 28, 30 of the wind turbine blades 18,20 are pitched to approximately 90 degrees pitch angle, such that the tip ends 18b,20b of the blades 18, 20 both point in the same direction along the rotational path of the wind turbine blades (in the case of the embodiment shown, in a counter clockwise direction). By arranging the swept sections of the blades in this manner, the aerodynamic profile of the blades 18, 20 is altered, and the blades will passively align in a substantially horizontal arrangement under the effect of the oncoming wind—the winds at the turbine will act to align the blade to the point of least resistance, thereby providing for reduced forces experienced by the wind turbine structure.

Pitching the blade sections in this manner means that at any point along the rotational path of the blades (apart from when the blades are horizontal), an oncoming horizontal wind will act on the relatively concave surface of the swept portion of one of the blades and the relatively convex surface of the swept portion of the other of the blades. This results in an increased drag force created on the blade which has the exposed concave surface, rotating the blades. The blades will rotate until the equilibrium position, wherein the forces experienced by each blade are equal. For a horizontal wind, this will mean that the blades will stabilize in a substantially horizontal at rest position.

To explain the principle behind the alignment of the blades, the wind turbine 10 having the swept sections pitched as indicated in FIGS. 3 and 4 can be compared to a cup anemometer device (normally used for measuring wind speed) having only two cups, as illustrated in FIG. 5.

The anemometer 100 comprises a pair of arms 102,104 provided on a pivot 106. At the end of the arms 102,104 an open-faced cup or half sphere is provided 108,110, the cups aligned such that the open face of the cups 108,110 point in the same direction along the path of rotation of the arms 102,104. In the example shown, the anemometer 100 rotates in a clockwise manner, with the cups 108,110 facing in a reverse direction along the path of rotation. In this example, the cups 108,110 of FIG. 5 are analogous to the pitched swept outer blade sections 28,30 of FIGS. 3 and 4, both having relatively concave and convex surfaces presented along the path of rotation of the arms/blades.

Figure 5A:
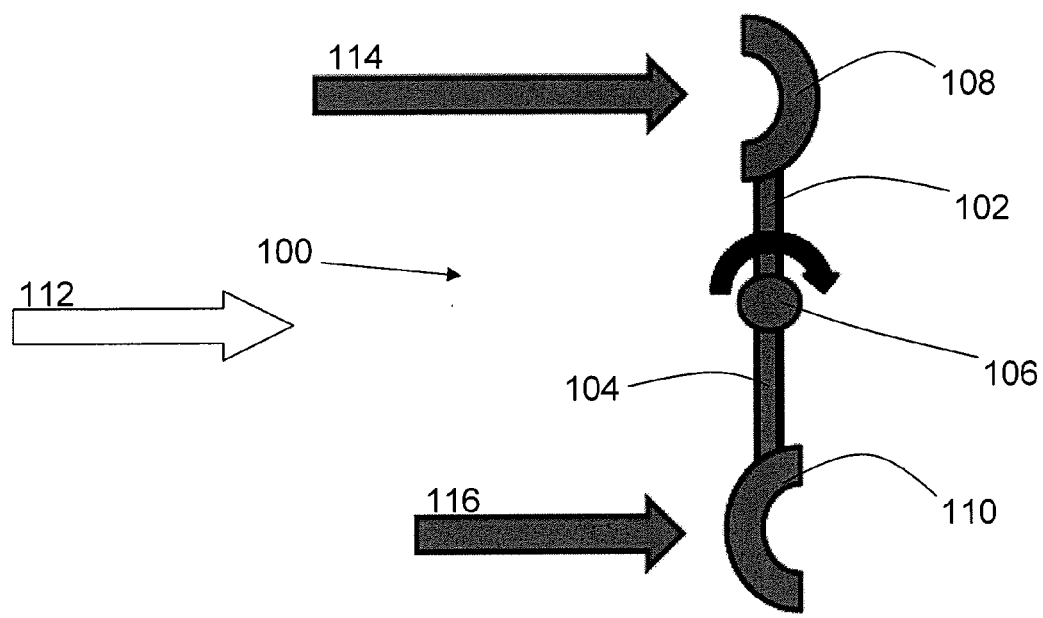
FIGS. 5(a) and 5(b) are sketches illustrating the balancing of forces in effect for the pitched wind turbine of FIG. 3.

In FIG. 5(a), when the arms 102, 104 are in a vertical position, the open face of one of the cups 108,110 faces in the direction of the oncoming wind (indicated by arrow 112). The open, relatively concave face of the cup 108, compared to the closed, relatively convex face of the cup 110, results in a greater drag force (indicated by arrow 114) generated on cup 108 and arm 102 than the drag force (indicated by arrow 116) generated on cup 110 and arm 104.

The greater drag force 114 on cup 108 acts to rotate the arm 102 and the cup 108 in a clockwise direction. If the arms 102, 104 rotate beyond the horizontal, then the open face of the cup 110 will be presented to the oncoming wind, and the corresponding increased drag force in cup 110 and the arm 104 will act to rotate the anemometer 100 further.

Figure 5B:
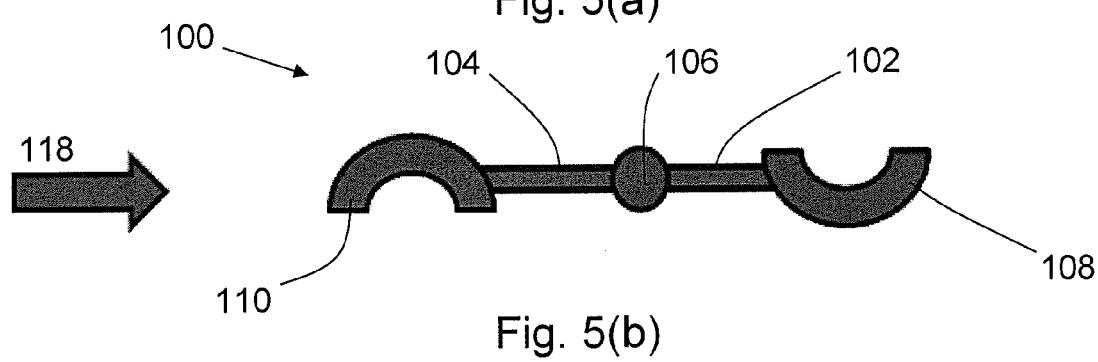

Eventually, the anemometer 100 will stabilize to a position where the drag on the two cups 108,110 is equal, i.e. when the arms 102, 104 are in a substantially horizontal position, as indicated in FIG. 5(b). Furthermore, the forces experienced by the anemometer 100 in this position are minimised (indicated by arrow 118), due to the reduced surface area of the anemometer exposed to the wind direction.

In a normal cup anemometer device, at least three cups and associated arms are needed to prevent the stabilisation of the anemometer in line with the wind. However, this principle allows for the passive alignment of the blades of a two-bladed swept-blade wind turbine with the wind direction at the turbine, to minimise wind loads on the turbine. The swept sections of the wind turbine blades are pitched such that the relatively concave surface of one of the blades acts to catch the force of the oncoming wind, to rotate the blades until they reach an equilibrium position in a substantially horizontal alignment.

It will be understood that the outer blade sections may be pitched such that the tip ends of the blades point in a forward direction along the path of rotation of the blades (for forward-swept blades, this would mean a pitch angle of approximately −90 degrees), or in a reverse direction along the path of rotation of the blades (for forward-swept blades, this would mean a pitch angle of approximately +90 degrees, as shown in FIGS. 3 and 4).

It has been found that a particularly advantageous configuration involves pitching the blades of a two-bladed swept-blade wind turbine such that a said first swept tip end has a pitch angle of approximately 85-95 degrees (preferably approximately 90 degrees) and a second swept tip end has a pitch angle of approximately 45-85 degrees (preferably approximately 55-65 degrees, further preferably approximately 60 degrees). Testing has shown that such a configuration provides improved performance and stability when used in the method of the invention. It is thought that this asymmetrical pitching acts to more effectively balance the wind turbine blades in a substantially horizontal position due to the effect of inertial forces, gravity, etc., and also accordingly acts to resist the rotation of the blades from said substantially horizontal position.

Testing has shown that the wind turbine blades provided in a relatively stable horizontal position, as described above, have an effective cone of stability provided around the position of the wind turbine blades aligned with the wind.

Starting with a wind direction of 0 degrees (taking 0 degrees to be the stable horizontal orientation of the wind turbine blades with the oncoming wind direction), a change in wind direction from 0 degrees will result in different forces experienced by the blades. As the wind changes direction to be coming from a point above/below the horizontal plane, the blades will experience forces attempting to rotate the blades along the blade rotational path. Once the wind direction exceeds a particular stability angle to the blades, the wind acts on enough of the blade surface area to provide sufficient force to start rotation of the blades.

If the blades rotate to a fully vertical position, the surface area of the rotor assembly exposed to the oncoming extreme wind is maximised, and as a result the resultant extreme wind loading experienced by the wind turbine structure is maximised.

A cone of stability extends around the stable at rest position of the blades, within which any changes in wind direction will not result in sufficient rotational forces operable to rotate the blades to a position where a greater surface area of the blades will be exposed to the general oncoming wind direction (the effective cone of stability is due to e.g. inertial moments, aerodynamic profile, etc.). For effective operation of the wind turbine safety shutdown procedure, a relatively large cone of stability is preferred, such that the blades are less sensitive to sudden changes in wind direction.

In the symmetrical pitching arrangement (where both outer blade sections are pitched to 90 degrees), to use the anemometer analogy, the two cups presented to the wind are of the same size, producing identical drag forces. The effect of the asymmetrical pitching arrangement (i.e. one blade section pitched at 90 degrees, the other blade section pitched at approximately 60 degrees), is to effectively reduce the size of one of the cup sections, adjusting the drag characteristics of that cup, and by extension the entire blade arrangement.

Wind tunnel testing has demonstrated that for the symmetrical pitching arrangement, the cone of stability for the tested blade design extends to an arc of approximately 20 degrees, centred at 0 degrees.

By contrast, wind tunnel testing of the same blade design using the asymmetrical pitching arrangement results in the cone of stability widening to an arc of approximately 60 degrees, centred at 0 degrees. (In the testing performed, the blade section which points into the wind direction is the section which is pitched to approximately 60 degrees.)

Accordingly, the asymmetrical pitching arrangement may lead to a wider cone of stability for the horizontally-provided blades.

In one embodiment, the safety shutdown procedure involves a two-step pitching sequence, in which the outer blade sections are initially pitched to 90 degree pitch angles, to ensure that the wind turbine blades quickly reach a stable horizontal position. Once horizontal, the controller is operable to pitch one of the blade sections (preferably the blade section pointing towards the direction of the oncoming wind) to a pitch angle of between 45-85 degrees (preferably between 55-65 degrees). Accordingly, the horizontal blades are pitched to provide a wider cone of stability for the changing wind direction, and provides improved performance for the duration of the extreme wind loads during the safety shutdown procedure.

The passive alignment of the blades in a horizontal position removes the requirement for the use of locking or braking systems to align the blades horizontally, and/or reduces wear and tear on such systems. As the rotor blades are aligned with the wind direction such that one of rotor blades effectively points into the direction of the oncoming wind, this reduces the surface area of the blades acted on by the extreme winds, and accordingly reduces the magnitude of the extreme loads experienced by the turbine structure.

While the invention may be used in a full pitch wind turbine, the use of the method of the invention in a partial pitch wind turbine presents further advantages, as the combined drag ratios for the inner and outer blade sections improve the stability of the system. This applies in cases where the inner blade sections of a partial pitch wind turbine comprise an airfoil shaped profile (as shown in FIG. 3).

While in the pitched position, the outer blade sections 28,30 are aligned such that the main body of the blade sections will face the wind (corresponding to the lower pressure side or upper suction side of the blade sections), the inner blade sections 24,26 remain unpitched. As a result, when the plane of rotation of the blades 18, 20 is aligned with the wind direction at the turbine 10, the oncoming wind will face the trailing edge (as in the embodiment shown in FIG. 3) or leading edge of the inner blade sections 24, 26.

Accordingly, while the relatively concave surface of the outer blade section will generate increased drag force to rotate the blades, the inner blade section will provide less drag (as the airfoil profile is in line with the wind), and consequently the blades of such a partial pitch two-bladed wind turbine will not rotate as fast as those of a full pitch wind turbine. Consequently, the stability of the horizontal position will be increased for a two-bladed partial pitch wind turbine having aerodynamically shaped inner blade sections, relative to a full pitch turbine.

In a preferred embodiment, the wind turbine blades 18, 20 are actively yawed to longitudinally align the plane of the rotational path of the blades 18, 20 with the wind direction at the turbine 10, e.g. using the wind turbine yaw mechanism. As the blades 18, 20 are actively yawed to point into the wind direction, this ensures that the blades 18, 20 will be accurately aligned with the wind direction at the turbine 10, regardless of turbine size and/or blade balancing.

It will be understood that the wind turbine 10 may comprise any suitable devices for determining wind speed, e.g. an anemometer, and wind direction, e.g. a wind vane provided on the wind turbine structure. Additionally or alternatively, the wind turbine 10 is operable to receive information regarding a forecasted wind direction for the turbine, and to yaw the wind turbine blades 18, 20 to align with said forecasted wind direction, e.g. in anticipation of extreme wind speeds from the forecasted direction.

By a substantially horizontal alignment, it will be understood that the blades 18,20 are arranged to be substantially parallel to the ground level (or sea level) relative to the wind turbine, e.g. +/−5 degrees. This is preferably in line with the wind direction at the turbine.

Figure 6:
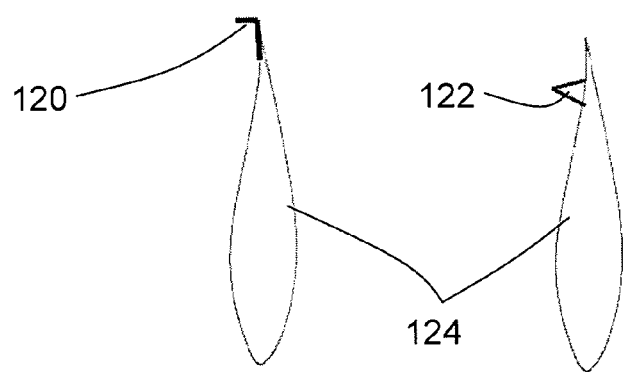
FIG. 6 illustrates two different methods of increasing the drag of the blades of the wind turbine of FIG. 1.

It will be understood that a number of enhanced embodiments may be used. While the invention is particularly suited to wind turbines having relatively high camber blades, it may be possible to increase the drag effect of the pitched sections of the blades to make the profiles more concave or "hollow". With reference to FIG. 6, a gurney flap 120 and a spoiler 122 are shown applied to the lower pressure side of a blade profile 124, to increase the drag of the blade profile 124 section when pitched as described above. Such a drag-increasing device 120, 122 may be affixed/retrofitted to the blade profile 124, or such devices may be acutatable as part of the safety shutdown procedure.

It will be understood that a moderate braking force may be applied in parallel with the above method to supplement the stabilisation of the wind turbine blades in a substantially horizontal position. Additionally or alternatively, an initial braking force may be applied to the wind turbine blades to slow the rotation of the blades to a speed at which the above described pitching of the safety shutdown procedure may be performed.

Figure 7:
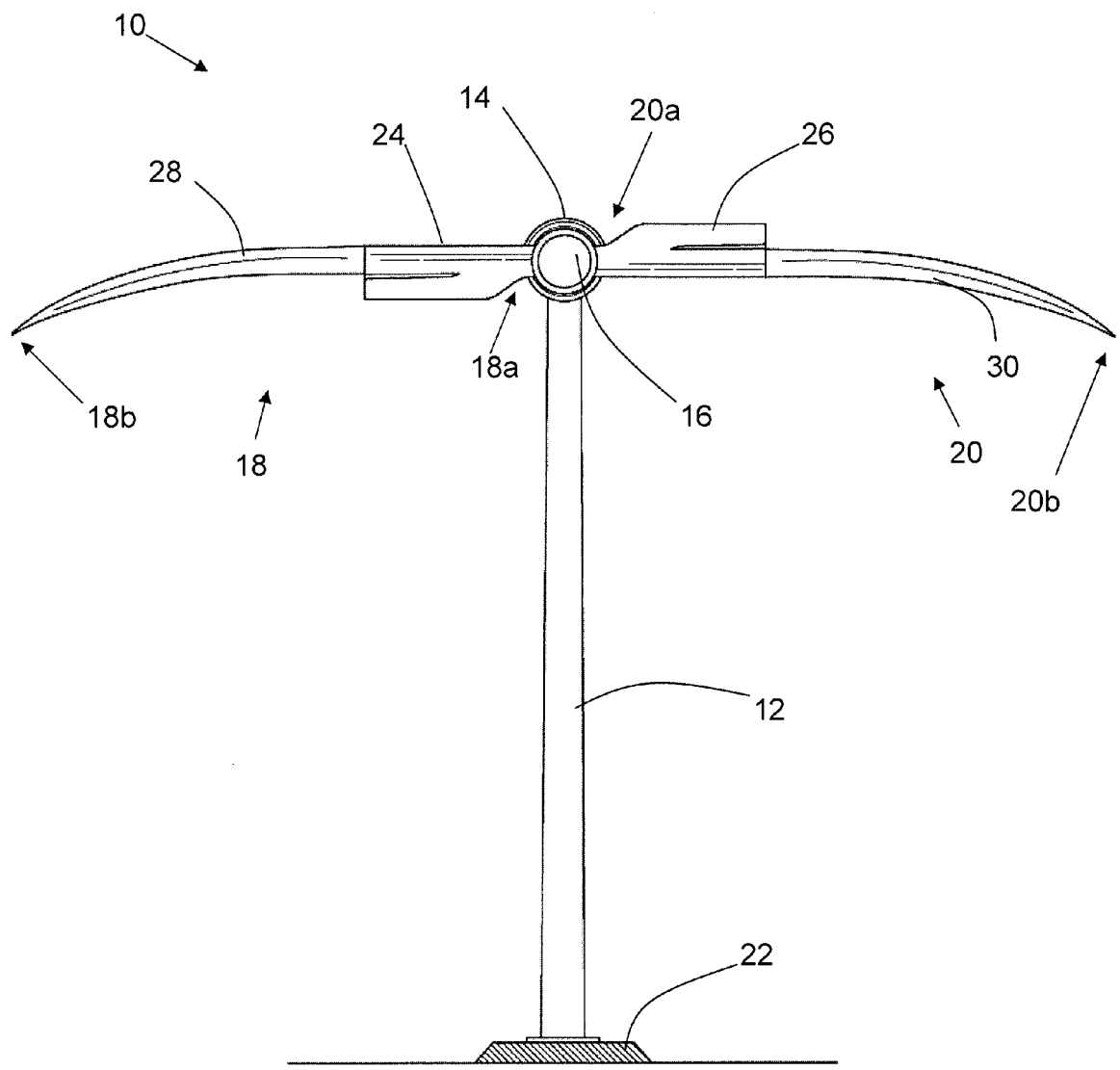
FIG. 7 is a front plan view of the wind turbine of FIG. 3 according to an enhanced version of the invention.

With reference to FIG. 7, a further enhancement of the system of the invention is illustrated. In FIG. 7, once the wind turbine blades 18, 20 are stabilized to a substantially horizontal position as described above, the controller may be operable to adjust the pitch angle of one or both of the blades 18, 20 such that the tip ends 18b, 20b of both outer blade sections 28, 30 point in opposite directions along the notional rotational path of the blades 18, 20, in particular in a downward direction towards the surface level. By pitching the blades 18, 20 in this manner, the centre of mass of the rotor assembly (comprising the rotor hub 16 and the blades 18, 20) is lowered below the pivot point of the rotor hub 16. Accordingly the rotor assembly has a lower centre of balance, and greater effort is required to rotate the blades 18, 20 from their current substantially horizontal position. Such a further step may provide additional stability, and prevent the movement of the blades 18, 20 when in such extreme wind conditions.

The positioning of the wind turbine blades in line with the wind direction, both in terms of the rotational angle and the yaw angle of the blades, means that the surface area of the rotor assembly exposed to the oncoming extreme winds is minimised, and the resultant extreme wind loads on the rotor assembly and wind turbine structure are reduced. This allows for a re-dimensioning of the components required for the particular wind turbine construction, resulting in a corresponding saving in wind turbine costs. The passive rotational alignment of the wind turbine blades with the wind direction at the turbine provides a simple and efficient method of ensuring that the minimum forces are experienced by the wind turbine structure.

The invention is not limited to the embodiment described herein, and may be modified or adapted without departing from the scope of the present invention.

What is claimed is:

1. A method for reducing extreme wind loads in a pitchable two-bladed wind turbine during extreme wind conditions, the wind turbine having a pair of wind turbine blades of at least 35 meters length, wherein the tip ends of the pair of wind turbine blades are swept relative to a central axis of the pair of wind turbine blades, the method comprising the steps of:
pitching the pair of wind turbine blades such that the swept tip ends, which swept tip ends have a swept profile that extends along a central axis of each of the pair of wind turbine blades, point in substantially the same direction along a rotational path of the pair of wind turbine blades, and, when pitching each of the pair of wind turbine blades to a pitch angle, the pair of wind turbine blades provide a combined aerodynamic profile, the combined aerodynamic profile acting to passively rotate the pair of wind turbine blades into a substantially horizontal alignment; and
aligning the substantially horizontal wind turbine blades such the pair of wind turbine blades are longitudinally aligned with a direction of a wind at the wind turbine to reduce the extreme wind loads experienced by the pair of wind turbine and stabilizing the pair of wind turbine blades in a substantially horizontal arrangement.

2. The method of claim 1, wherein the step of pitching comprises pitching said pair of wind turbine blades such that the swept tip ends have a pitch angle of approximately 90 degrees.

3. The method of claim 1, wherein a first of said pair of wind turbine blades has a first swept tip end and a second of said pair of wind turbine blades has a second swept tip end, and wherein the step of pitching comprises pitching said first wind turbine blade such that said first swept tip end has a pitch angle of approximately 85-95 degrees and pitching said second wind turbine blade such that said second swept tip end has a pitch angle of approximately 45-85 degrees.

4. The method of claim 1, wherein the method comprises the steps of:
pitching said pair of wind turbine blades such that said swept tip ends of said pair of wind turbine blades have a pitch angle of approximately 85-95 degrees to passively align the wind turbine blades in said substantially horizontal alignment; and
when said pair of wind turbine blades are substantially horizontally aligned, pitching one of said wind turbine blades such that the tip end of said one of said wind turbine blades has a pitch angle of between approximately 45-85 degrees.

5. The method of claim 3, wherein said step of pitching is performed such that the second wind turbine blade which is pitched to a pitch angle of between approximately 45-85 degrees is one of the pair of wind turbine blades which points into the direction of the wind at the wind turbine.

6. The method of claim 4, wherein said step of pitching is performed such that the one of the pair of wind turbine blades which is pitched to a pitch angle of between approximately 45-85 degrees is one of the pair of wind turbine blade which points into the direction of the wind at the wind turbine.

7. The method of claim 1, wherein each of the pair of wind turbine blades forms a substantially concave pressure side and a substantially convex suction side along the central axis thereof, and wherein the method comprises:
pitching at least a portion of said pair of wind turbine blades such that at least a portion of said concave pressure sides face in substantially the same direction along the rotational path of the pair of wind turbine blades, such that the drag forces produced by the concave pressure side of a first of said wind turbine blades and the convex suction side of a second of said wind turbine blades will substantially balance with the drag forces produced by the convex suction side of the first wind turbine blade and the concave pressure side of the second wind turbine blade to provide said stabilization of the pair of wind turbine blades in the substantially horizontal arrangement.

8. The method of claim 7, wherein the method comprises the step of increasing the drag of the pitched concave pressure sides of the pair of wind turbine blades.

9. The method of claim 1, wherein the method comprises the steps of:
in the event of an extreme wind condition, pitching the pair of wind turbine blades such that the swept tip ends of the pair of wind turbine blades point in substantially the same direction along the rotational path of the pair of wind turbine blades, and aligning said pair of wind turbine blades such that the rotational path of the pair of wind turbine blades is in line with the pair of wind direction at the pair of wind turbine, such that the pitched swept tip ends act to align the pair of wind turbine blades in a substantially horizontal position; and
when in a substantially horizontal position, pitching the pair of wind turbine blades such that the swept tip ends of the pair of wind turbine blades point in a substantially downwards direction, to lower the center of mass of the pair of wind turbine blades and to resist the rotation of the pair of wind turbine blades from said substantially horizontal position.

10. The method of claim 1, wherein the wind turbine comprises a tower, a nacelle located at the top of said tower, a rotor hub rotatably mounted at said nacelle, a generator coupled to said rotor hub via a shaft, the pair of wind turbine blades of at least 35 meters length provided on said rotor hub, and a yaw system coupled to said nacelle, and wherein said step of aligning the substantially horizontal pair of wind turbine blades comprises actively yawing said nacelle and said rotor hub by actuating said yaw system.

11. The method of claim 1, wherein the pair of wind turbine blades comprise a partial pitch blade having an inner blade section and an outer blade section, and wherein said step of pitching comprises pitching said outer blade section relative to said inner blade section.

12. A wind turbine comprising
a tower,
a nacelle located at the top of said tower,
a rotor hub rotatably mounted at said nacelle,
a generator coupled to said rotor hub via a shaft, and
first and second wind turbine blades of a length of at least 35 meters provided on said rotor hub, where tip ends of the first and second wind turbine blades are swept relative to a central axis of said first and second wind turbine blades so as each of the first and second wind turbine blades forms a substantially concave pressure side and a substantially convex suction side along the central axis thereof, wherein the first and second wind turbine further comprises a controller configured to pitch the first and second wind turbine blades to a pitch angle such that the swept tip ends of the first and second wind turbine blades point in substantially the same direction along a rotational path of the first and second wind turbine blades, wherein the first and second wind turbine blades provide a combined aerodynamic profile configured to passively rotate the first and second wind turbine blades into a substantially horizontal alignment and stabilizing the first and second wind turbine blades in a substantially horizontal arrangement and wherein the controller is further configured to longitudinally align the substantially horizontal first and second wind turbine blades with the wind direction to reduce extreme wind loads experienced by the wind turbine blades.

* * * * *